Aug. 29, 1950     H. E. PEARSON     2,520,430
NEEDLE VALVE
Filed Dec. 1, 1947
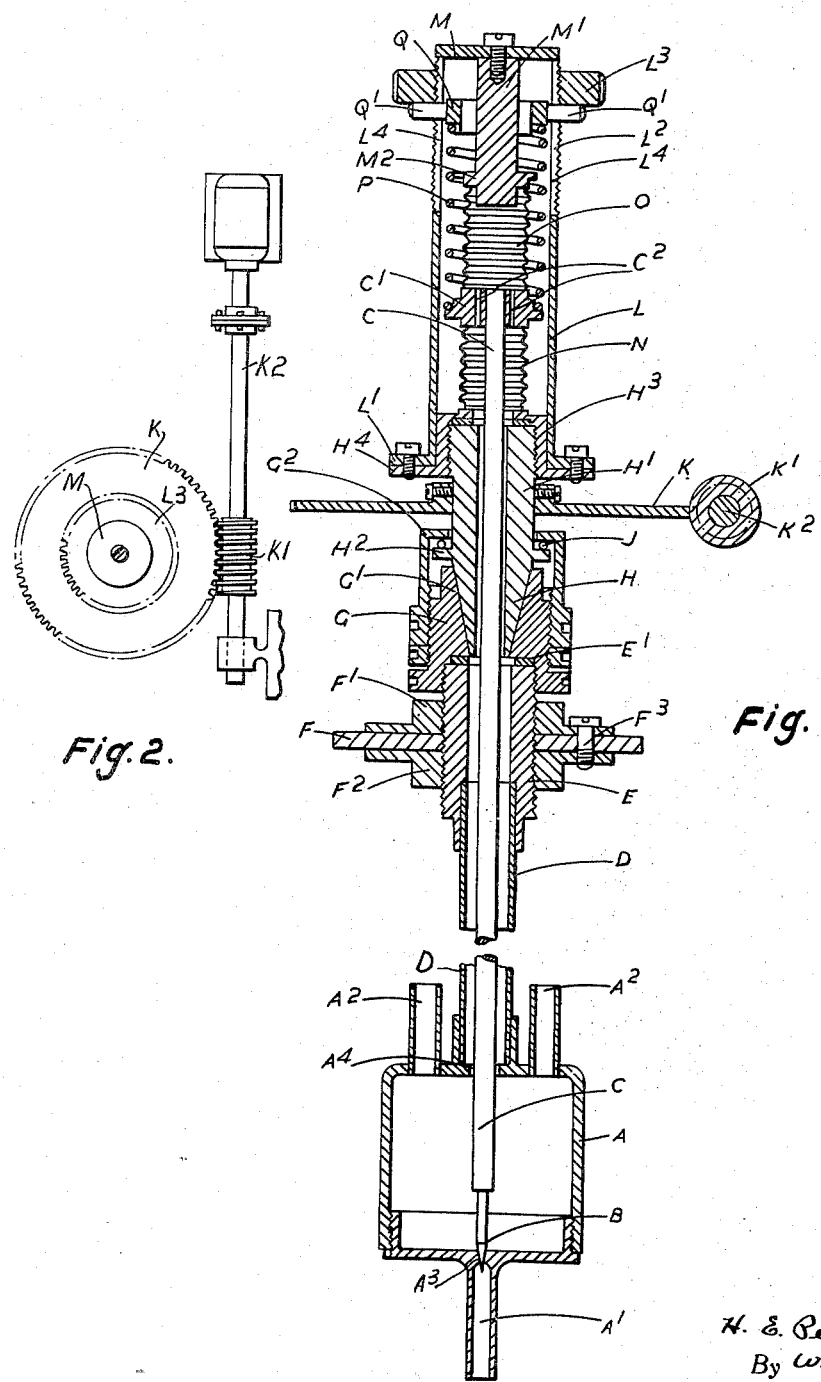
Inventor
H. E. Pearson
By Watson, Cole,
Grindle + Watson
Attorney Patented Aug. 29, 1950

2,520,430

UNITED STATES PATENT OFFICE 2,520,430

NEEDLE VALVE

Henry Edward Pearson, Cambridge, England, assignor to Harry Ralph Ricardo, London, England Application December 1, 1947, Serial No. 789,042
In Great Britain December 4, 1946

5 Claims. (Cl. 62—1)

This invention relates to needle valves and more especially those which are used in gas liquifying apparatus and has for its object the overcoming of a disadvantage associated with these valves as hitherto employed under certain conditions.

In apparatus of this type as used for example for the liquifaction of oxygen or air inconvenience is caused by the tendency for ice to collect around and hinder the operation of a needle valve. In the present improved construction this is prevented and the valve maintained free to engage its seat or be lifted from it.

According to this invention the improved construction and arrangement comprises in combination a needle valve on one end of a stem, a chamber having inflow and outflow passages for fluid and a seating for the valve in the orifice of one of these passages, a tubular casing enclosing the valve stem and extending from the chamber in which the valve is situated to a fixed part in which is a conical seating, a conical member engaging and rotatable in this seating and connected to the end of the valve stem remote from the valve, a thrust bearing associated with this conical member and a worm wheel mounted on the member, means for imparting constantly or otherwise to the valve stem through this worm wheel a rotary movement about the valve axis, and an adjustable spring acting on the valve stem and tending to keep the conical member on its seat. The end of the stem remote from the valve is connected to another conical member which carries the worm wheel. The stem extends through two bellows structures which permit movement of the stem and valve in the direction of its axis and constitute a gas seal around the end of the stem to which one end of each bellows is attached. The other ends of these bellows are connected respectively to the opposite ends of a tubular casing which is itself mounted at one of its ends on the conical rotatable member, a coiled spring being disposed between the end of the valve stem and an adjustable member in the tubular casing. The stem may be rotated for example by a worm which is driven by an electric motor and engages the worm wheel carried by the conical member which is connected to the valve stem.

In the accompanying drawing, Figure 1 is a longitudinal sectional elevation illustrating by way of example a construction of the improved valve as adapted for use more especially in apparatus for the liquefaction of oxygen, and Figure 2 is a plan view on a reduced scale of the apparatus shown in Figure 1.

The gas in question passes through a chamber A entering at $A^1$ and flowing out at $A^2$. A needle B is seated in the orifice $A^3$ at the end of the pipe $A^1$ through which the gas flows into the chamber A. The stem C on the end of which is carried the needle B passes out from the chamber A through an opening $A^4$ in the wall of the chamber opposite to the orifice and valve seat $A^3$. The valve stem C extends for example upwards for a convenient distance being enclosed for a substantial part of its length in a tube D which forms a gas-tight casing around the valve stem and between the upper side of the chamber A and a cylindrical member E which is externally screw threaded and passes through a hole in a fixed plate F or the like on which the valve structure is to be mounted. The member E is fixed in the desired vertical position in the supporting plate F by two collars $F^1$ and $F^2$ which are internally threaded to engage the outside of the member E and lying on each side of the plate F enable the member E to be firmly attached to the plate. The collars are locked against slacking back by a set screw $F^3$.

Mounted on the upper end of the member E and with an interposed sealing ring or washer $E^1$ is a hollow member G conveniently made of bronze and provided internally with a conical surface $G^1$ constituting a seating for the conical end H of an otherwise cylindrical piece $H^1$ which is constructed for instance of steel and is rotatable in the seating $G^1$. The piece H, $H^1$ has an external flange $H^2$ at the place where the conical formation of the end begins. A thrust bearing J is interposed between the flange $H^2$ and a cap $G^2$ adjustably mounted on the seat member G. On the cylindrical part $H^1$ is mounted a worm wheel K which engages a worm $K^1$ on a shaft $K^2$ suitably disposed and driven for example by an electric motor. This arrangement provides a gas-tight seal between the fixed plate or other part F and the rotatable member H, $H^1$.

The piece H, $H^1$ is hollow throughout and the valve stem C runs right through it so that the piece H, $H^1$ can be rotated freely irrespective of longitudinal movement that may be given to the valve stem to adjust the setting of the needle B with respect to its seat $A^3$ and when it lifts from that seat. A flanged nut $H^3$ is screwed onto the upper end of the part $H^1$ and to the flange $H^4$ is connected the lower end of a tubular casing L through a flange $L^1$ at the end of that casing. The upper end portion of the tubular casing L is externally screw threaded at $L^2$ and carries a nut $L^3$. In this end portion are two longitudinally extending slots $L^4$ which lie opposite to each other. The upper end of the tube L is closed by a plate or plug M which is fixed in place and from which a projection $M^1$ extends downwards into the tube L. On the upper end of the valve stem C is a collar $C^1$ with holes $C^2$ running through it and this collar can move freely within the casing L. A tubular bellows N surrounds the end portion of the valve stem C and is connected at one end to the collar $C^1$ and at the other to the nut $H^3$. A similar bellows O extends between the upperside of the collar $C^1$ and a flange $M^2$ around the inner end of the projection $M^1$, and the opposite ends of this bellows are respectively connected to these parts. These bellows N and O thus serve to connect the valve stem C to the rotatable member H, $H^1$ and also seal off the gas chamber A from all communication with the air. A coiled spring P surrounds the upper bellows O and abuts at one end on the collar $C^1$ and at the other and upper end against an annulus Q which lies around the plug extension $M^1$ and has radially projecting lugs or fingers $Q^1$ which are positioned diametrically opposite and respectively projecting through the slots $L^4$ in the tubular casing L and lie against the under side of the nut $L^3$. By rotation of the nut $L^3$ on the casing L the loading by the spring P on the valve stem C and the valve B can be altered. The bellows structures N and O are of known type and while adapted to yield in the axial direction so as to permit longitudinal movement of the valve stem C these bellows will transmit torque and as mentioned serve as a gastight seal around the upper end of the valve stem. The spring P tends to keep the valve B on its seat.

The above arrangement ensures that the needle valve B will always be free to be lifted off its seat by fluid pressure against the action of the adjustable spring P, while the rotation imparted to the valve keeps the valve seat $A^3$ clear of ice or other matter liable to prevent the proper seating of the valve whether the valve is on or raised off its seat. In some cases if it is not necessary to rotate the valve B constantly rotation may be imparted to it only intermittently. The movement given to the valve about its axis may be oscillatory and not necessarily continuous in one direction.

It will be seen that in the arrangement described the valve B and stem C are free to move longitudinally without the restraint of glands or the like or of friction imposed upon them by any sliding movement between them and a fixed part and at the same time rotation is imparted to the valve B and stem C from the directly driven member H, $H^1$ through the bellows N and the member $C^1$. Such rotation may also be regarded as imparted to the member $C^1$ from the member H, $H^1$ by way of the member L, the member M, $M^1$ and the bellows O so that the two bellows N and O serve to permit freedom of longitudinal movement to the valve stem C while imparting rotation to it and serving to prevent escape of fluid through the space around the stem C.

What I claim as my invention and desire to secure by Letters Patent is:

1. Valve apparatus comprising in combination a chamber having inflow and outflow passages for fluid, a seating for a valve in the orifice of one of these passages, a needle valve arranged to engage the said seating, a stem on which the needle valve is carried, this stem passing out through an opening in the wall of the said chamber, a fixed tubular casing through which the valve stem passes freely, a tubular rotary member through which the valve stem projects freely, a substantially fluid-tight seal between the fixed casing and the tubular rotary member permitting relative rotation between them, at least one flexible wall extending between the tubular rotary member and the valve stem to prevent escape of fluid through the tubular rotary member, and means for imparting rotation to the tubular rotary member and hence through the flexible wall to the valve stem.

2. Valve apparatus as claimed in claim 1, in which the fluid-tight seal between the fixed tubular casing and the tubular rotary member is constituted by engaging conical surfaces on these two parts and a thrust bearing which holds the conical surfaces in engagement while permitting relative rotation between them.

3. Valve apparatus as claimed in claim 1, including an annular thrust member on the valve stem, a tubular bellows connecting one face of the thrust member to the adjacent end of the tubular rotary member, a member rigid with the tubular rotary member, a second bellows connecting the other face of the thrust member to said last named member, said thrust member being formed to provide free communication between the interiors of the two bellows through the thrust member, and an adjustable spring acting on the thrust member.

4. Valve apparatus as claimed in claim 3, in which the fluid-tight seal between the fixed tubular casing and the tubular rotary member is constituted by engaging conical surfaces on these two parts and a thrust bearing which holds the two surfaces in engagement while permitting their relative rotation.

5. Valve apparatus as claimed in claim 1, in which the tubular rotary member has rigidly connected to it an extension which projects beyond the end of the valve stem, a thrust member rigidly mounted on the valve stem, two bellows connecting said thrust member with the end of the tubular rotary member and the extension respectively, said bellows communicating with one another through the thrust member, and a spring surrounding the bellows remote from the tubular rotary member and acting on the thrust member.

HENRY EDWARD PEARSON.

REFERENCES CITED

The following references are of record in the file of this patent:

UNITED STATES PATENTS

| Number | Name | Date |
| --- | --- | --- |
| 1,470,974 | Hardinge | Oct. 16, 1923 |
| 1,546,580 | Hardinge | July 21, 1925 |
| 1,594,021 | Smith | July 27, 1926 |
| 1,604,776 | Hardinge | Oct. 26, 1926 |
| 1,932,404 | Hamblin | Oct. 31, 1933 |
| 1,940,090 | Hetherington | Dec. 19, 1933 |